United States Patent [19]
Sartori

[11] Patent Number: 6,047,223
[45] Date of Patent: Apr. 4, 2000

[54] ELECTRONIC COMPUTER HAVING A MAGNETO-OPTIC UNIT

[75] Inventor: Gabriele Sartori, Lessona, Italy

[73] Assignee: Ing. C. Olivetti & C., S.p.A., Ivrea, Italy

[21] Appl. No.: 08/973,165

[22] PCT Filed: May 17, 1996

[86] PCT No.: PCT/IT96/00101

§ 371 Date: Nov. 19, 1997

§ 102(e) Date: Nov. 19, 1997

[87] PCT Pub. No.: WO96/38841

PCT Pub. Date: Dec. 5, 1996

[30] Foreign Application Priority Data

May 29, 1995 [IT] Italy ................................. TO95A0434

[51] Int. Cl.⁷ ...................................................... G05B 9/02
[52] U.S. Cl. ........................................ 700/83; 434/307 A
[58] Field of Search ................. 710/10, 101; 434/307 A; 700/16, 93

[56] References Cited

U.S. PATENT DOCUMENTS 5,634,798 6/1997 Suh ...................................... 434/307 A
5,721,951 2/1998 DorEl ...................................... 395/830
5,835,733 11/1998 Walsh et al. ............................. 395/281

FOREIGN PATENT DOCUMENTS

| 0453 108 | 10/1991 | European Pat. Off. . |
| 0495 518 | 7/1992 | European Pat. Off. . |
| 0569 244 | 10/1993 | European Pat. Off. . |
| 61-271659 | 1/1986 | Japan . |
| 7288874 | 10/1995 | Japan . |
| WO 94/20921 | 9/1994 | WIPO ........................................ 15/62 |

*Primary Examiner*—William Grant
*Assistant Examiner*—Chad Rapp
*Attorney, Agent, or Firm*—Banner & Witcoff, Ltd.

[57] ABSTRACT

This invention refers to an electronic computer 10 having a reader 21 for the reading of removable magneto-optic media (CD-ROM) 14. The electronic computer 10 allows even non-expert users to playback the CD-ROM media by pressing pushbuttons 48 on a button panel 45 and visualises on a display 47 information concerning the type of CD-ROM inserted in the reader 21 and the functionality selected. The electronic computer 10 is also capable of passing automatically from an operating state of maximum performance to one of reduced performance with a resultant reduction in electrical energy consumption. The electronic computer 10 can also be connected to television sets 12 and to video recorders 13. The computer 10 according to this invention, while possessing the functionality described above, still remains flexible, powerful, and upgradable, which are attributes typical of personal computers.

7 Claims, 4 Drawing Sheets

ELECTRONIC COMPUTER HAVING A MAGNETO-OPTIC UNIT

TECHNICAL FIELD

This invention refers to an electronic computer for handling magneto-optic media, comprising a central processing unit (CPU), memory means connected to the CPU for storing data and programs, a compact disk (CD) reading unit connected to the CPU for reading data pre-recorded on a removable disk of different type (AUDIO-CD, PHOTO-CD, VIDEO-CD), input receiving means connected to the CPU for receiving input from an external input unit and connecting means for connecting an external video unit to the CPU. More precisely, this invention refers to an electronic computer for the handling of optical type compact disks (CD-ROM).

BACKGROUND ART

Personal computers are known in the current art that are used to read and playback optic and/or magnetic media. These computers, one of which is the Applicant's PCS Educator, use either a keyboard or a pointing device, commonly known as a "mouse", to activate the read and playback functionality of the CD-ROM and have the Personal Computer's monitor as their visual display device.

Also known in the current art is the use of commercial appliances, known as CD-players, to read and playback CD-ROM's. These appliances provide for actuation of the various controls by means of a plurality of pushbuttons, each with a predefined functionality, and have a television set as their visual display device. Inter alia, from European Publication EP-A-453108, is known a CD-player for playing CD-audio and memory disk which comprises a system controller, having a microcomputer, for controlling the entire system, an operating section, for issuing various commands in response to the user's key entries, and an image display controller, associated to a Liquid Crystal Display, for displaying images, such as a map. Such CD-player is able to determine whether the disk to be played is a CD-audio or a memory disk on the basis of identifying information in the TOC (Table Of Contents) of the disk.

The known computers, though they allow reading and playing of CD-ROMs, are of limited performance with respect to the commercial CD-players insofar as they are not apt for reading and playback of all the types of CD-ROM available on the market, nor for use of the television as the preferential visual display device, nor for connection to other magnetic media playback devices, such as video recorders for example. Further, the known computers are difficult for non-expert users to use as they require utilisation of devices, such as the keyboard or mouse, with which domestic users are unfamiliar.

On the other hand, though the CD-players are easy to use, they can only read and playback CD-ROMs and cannot perform any other processing work. In addition, these devices have the drawback that they are not upgradable, so that their performance cannot be improved upon nor can their characteristics be enhanced, for example following introduction of a new type CD-ROM.

SUMMARY OF INVENTION

The purpose of this invention is that of presenting an electronic computer which, though remaining highly flexible, powerful and upgradable, allows users to select and actuate the various CD-ROM read and playback functions both easily and immediately.

In accordance with this purpose, the electronic computer, according to the present invention, is characterised by a console having a plurality of actuating elements selectively actuatable for generating command signals, by a display unit, and by control means connected to the actuating elements, to the display unit and to the CPU; wherein the CPU is able to recognise the type of removable disk inserted in the CD reading unit by comparing the data read from the removable disk with the data stored into the memory means and to transmit to the control means I/O signals indicative of the type of removable disk inserted, and wherein the control means controls the display unit and the actuating elements to display information relating to the type of removable disk inserted into the CD reading unit and to enable the actuating elements to transmit the command signals to the CPU for commanding the functions (Play,Pause,Stop,FF,etc.) of the CD reading unit on the basis of predefined programs stored into the memory means.

According to a further characteristic of this invention, the electronic computer is characterised by the fact that it has automatic means for the control of its electric power supply, which are suitable for generating, after a predetermined time or following depression of a given push-button, a switching signal that results in switching from a operating state of full performance, accompanied by a greater consumption of electricity, to a stand-by state of operation where less electricity is consumed.

According to a further characteristic of this invention, the electronic computer is provided with communication means that may be controlled by the central processing unit and can be connected to a television or to a video recorder unit to visualise the contents of the CD-ROMs or the data processed by the computer on the television and/or to record the above-mentioned contents or data on the video recorder.

BRIEF DESCRIPTION OF DRAWINGS

This and other characteristics of the present invention will become apparent when the following description of a preferred embodiment, provided by way of a non-exhaustive example, is considered in conjunction with the accompanying drawings, in which.

PREFERRED MODE FOR CARRYING OUT THE INVENTION

Figure 1:
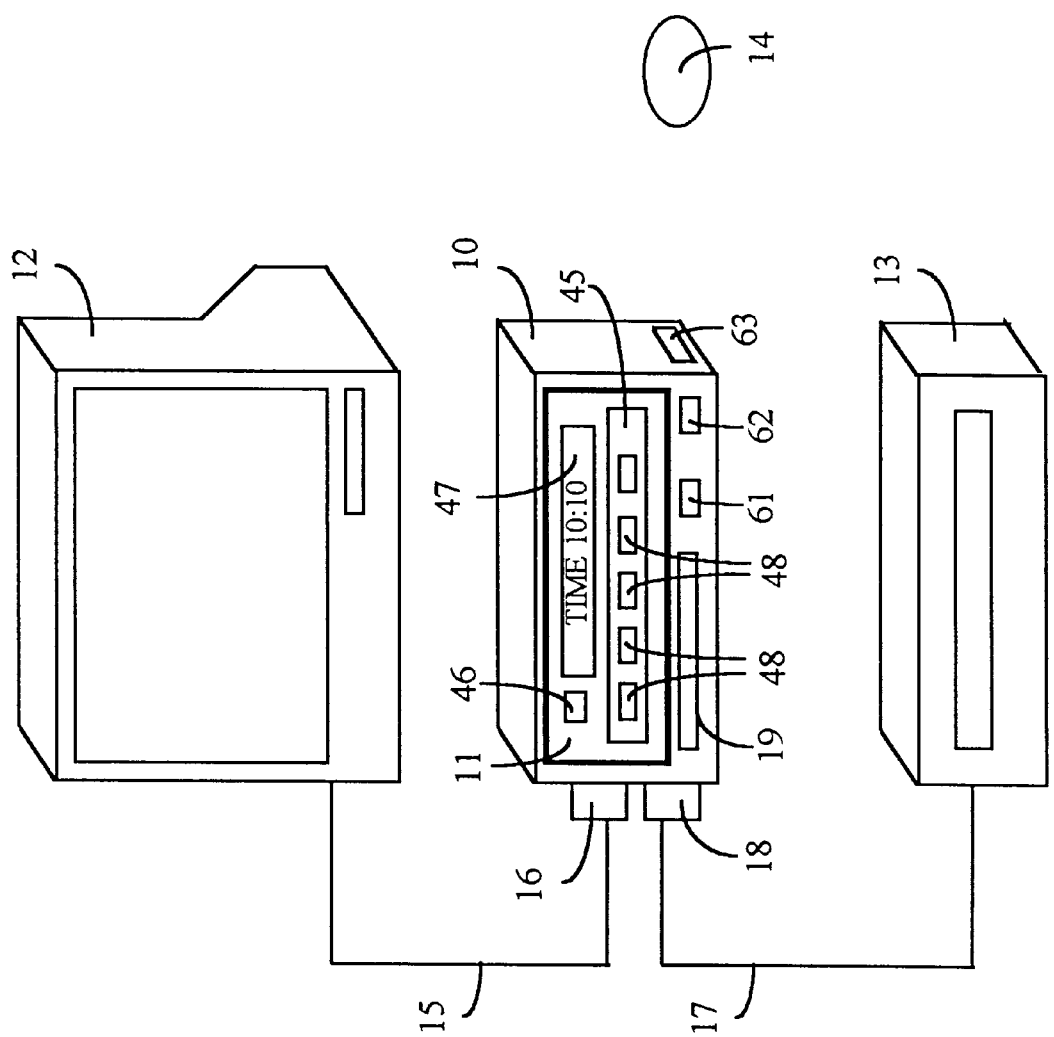
FIG. 1 represents a general diagram of the electronic computer according to the present invention.
Figure 2:
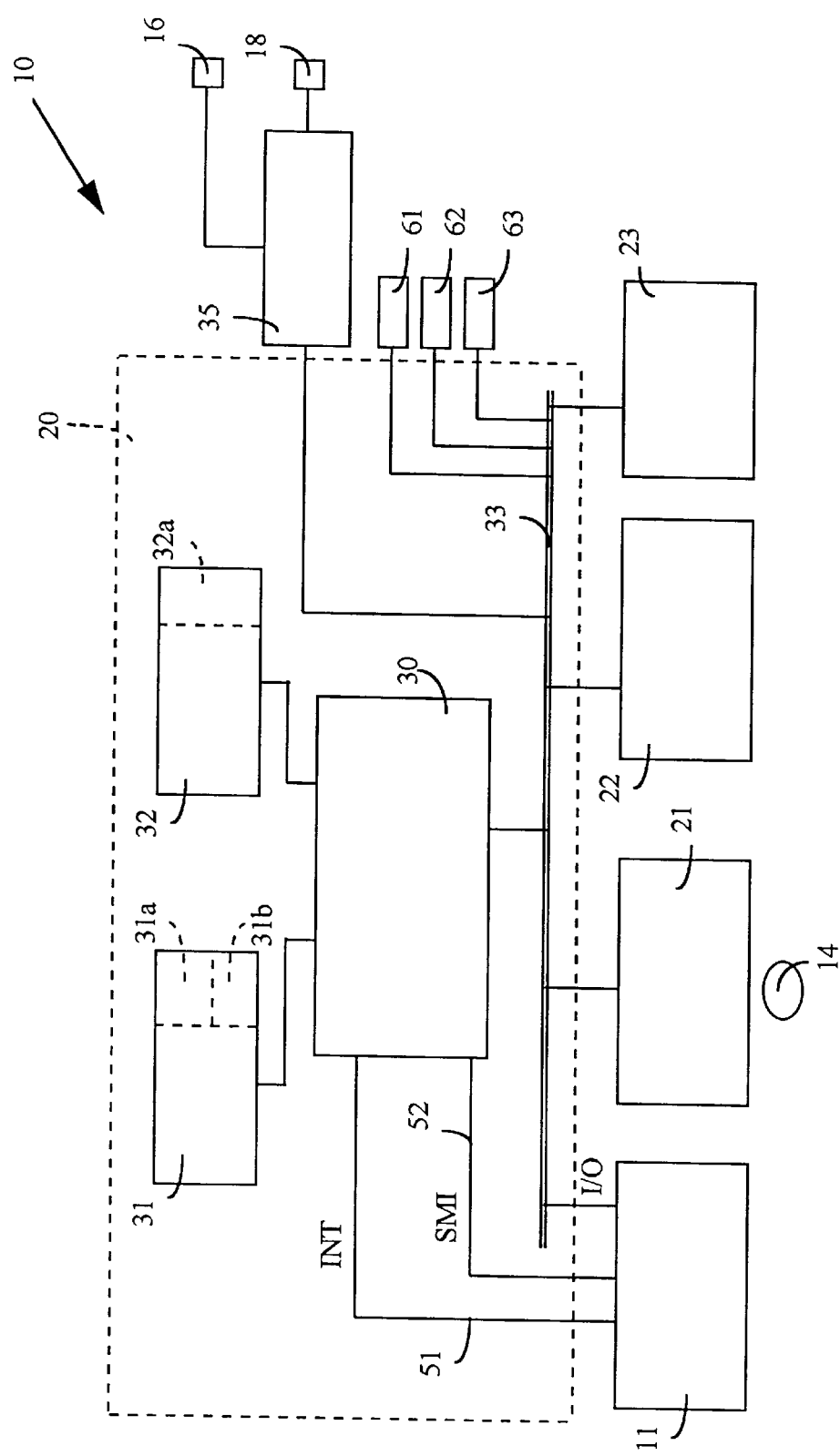
FIG. 2 represents a block diagram of the computer of FIG. 1.

With reference to FIG. 1 and FIG. 2, an electronic computer 10, according to the present invention, comprises a motherboard 20, a reader 21 for magneto-optic disks (CD-ROM) 14, a console 11, a speaker device 22 and a hard disk type memory unit (HDU) 23.

Electronic computer 10 further comprises a video interface logic (SCART controller) 35 and a series of known type connection sockets 61, 62 and 63, apt to be connected respectively to a keyboard, a mouse and a monitor, not shown on the drawings.

Reader 21, console 11, speaker 22, HDU 23, SCART controller 35 and the series of sockets 61, 62 and 63 are connected to a data channel 33 of motherboard 20.

Motherboard 20 comprises a central processing unit (CPU) 30 and both a random access memory (RAM) 32 and a read only memory (ROM) 31, both connected to CPU 30.

Motherboard 20 may be comprised, for example, of a motherboard for Personal Computer and is suitable for processing programs recorded on HDU 23 and reading, through reader 21, data pre-recorded on CD-ROMs 14, which may be of the AUDIO, PHOTO, VIDEO or DATA types. Reader 21 comprises a slot 19 in which CD-ROMs 14 are capable of being removably inserted. Console 11 comprises a display unit 47 suitable for the display of messages and a button panel 45, having a plurality of pushbuttons 48 suitable to be activated to transmit predefined commands to the CPU 30, either along data channel 33 or through two lines 51 and 52.

SCART controller 35 is apt to be connected to a television set 12 and a video recorder 13, both known in the current art, by means respectively of SCART plugs (16 and 18) and cables (15 and 17) and is apt to transmit the data read by reader 21 to television set 12 and/or video-recorder 13 for playback. SCART controller 35 is also apt to transmit, in a known way, audio and video signals from video recorder 13 to television set 12.

ROM 31 is suitable for storing the firmware programs, developed during the design stage of motherboard 20, and comprises two areas (31*a* and 31*b*) in which the instructions are stored that cause electronic computer 10 to execute given functions that will be described later in detail.

RAM 32 comprises an area 32*a* in which information from the CD-ROM inserted in reader 21 is apt to be stored, as will be described later in detail. CPU 30 which is constituted, for example, by a 486SL microprocessor produced by INTEL Inc., is suitable for supporting a protected type system management feature called "Protect and System Management Mode", already described in Patent Application No. TO95A000122, filed on Feb. 21st 1995 by the Applicant. This feature is originated by a System Management Interrupt signal, hereinafter simply "SMI", and is characterised by the fact that CPU 30, once it receives the SMI signal, suspends current activity, handles the instructions provided for in the motherboard 20 design stage and stored in ROM 31 concerning the SMI signal received, before returning to regular activity as if the interrupt had never happened.

Figure 3:
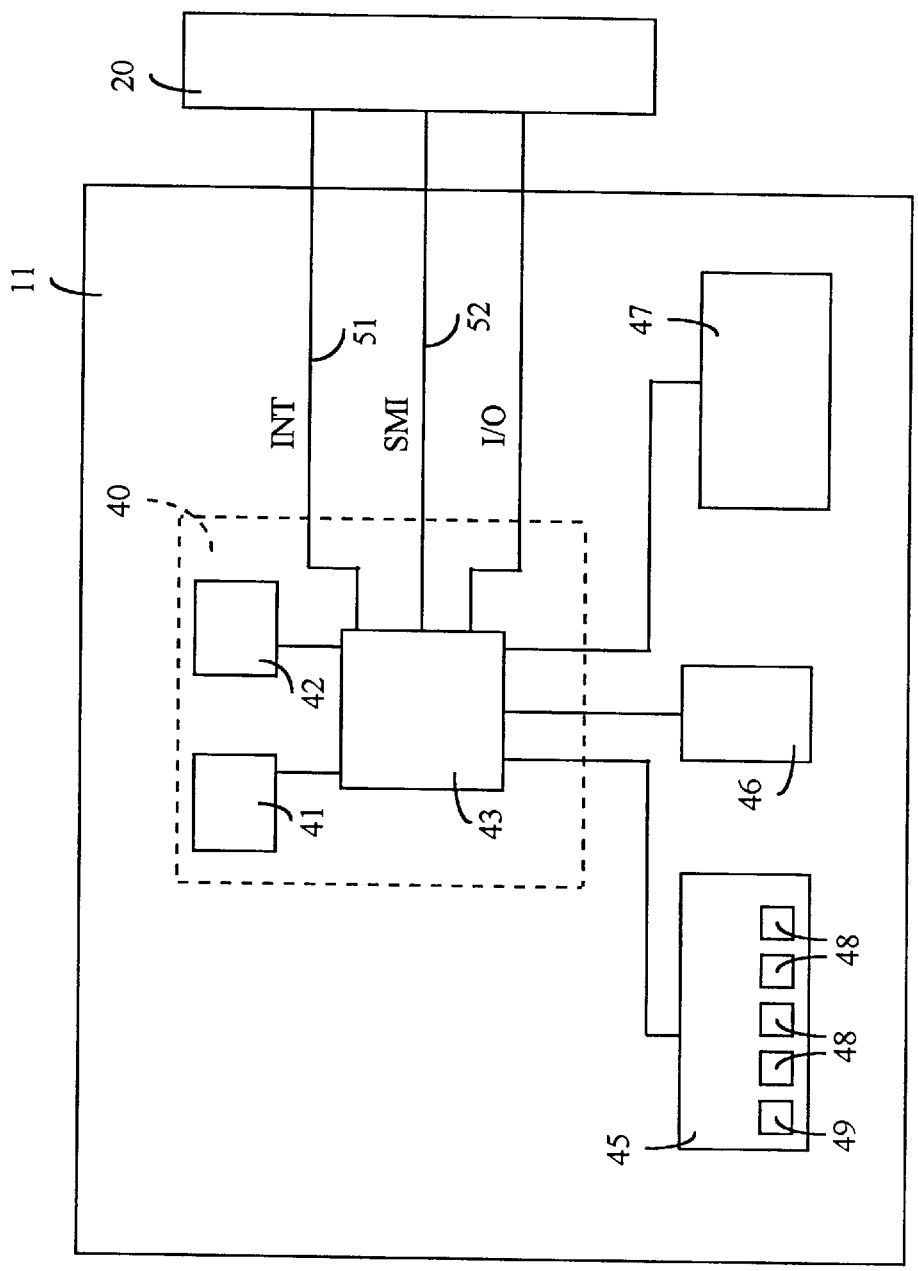
FIG. 3 represents a block diagram of the console of the computer of FIG. 2.

Console 11 comprises a microchip 40 (FIG. 3) to which button panel 45, display 47 and a light-emitting diode (LED) 46 are connected.

Microchip 40 is constituted, for example, by the 75268 MICROCHIP produced by Nippon Electric Corporation and comprises a central processing unit (CPU) 43, a read only memory (ROM) 41, suitable for recording programs developed in the console 11 design stage, and a random access memory (RAM) 42.

Console 11 is suitable for transmitting CPU 30, through line 52, the SMI signal and consequently institute Protect and System Management Mode.

Console 11 is also suitable for transmitting, through line 51, an interrupt signal INT causing CPU 30 to suspend, in a known way, its activity in expectation of input/output data (I/O) directed by console 11 to data channel 33.

Button panel 45 comprises a plurality of function buttons 48, such as "PLAY", "PAUSE", "FAST FORWARD", "REWIND" and "STOP" commonly used on commercial type appliances, video recorders and CD-players for example, and is suitable for transmitting predefined signals to microchip 40, preferably by depressing one or more pushbuttons 48 in combination. One button 49 of button panel 45 (stand-by button) is suitable for transmitting the SMI signal to motherboard 20.

Operation of the electronic computer 10 described up to this point is as follows.

As is known, CD-ROMs are formatted in such a way as to include a "Lead-in area" in which the table of contents (TOC) is stored, containing the number of tracks used, total playing time and, for each track, both the type of information recorded and the address of the track on the CD-ROM. In another area of the CD-ROM, indications are recorded (VTOC) on the CD-ROM Directory structure, such as an index, names and dimensions of the data files. These indications are not featured on the CD-AUDIO media.

The specifications concerning data formatting on the CD-ROMs are described in standard manuals, named after the colour of the cover; for example, the CD-AUDIO specifications are described in the RED-BOOK, the DATA CD-ROM specifications are described in the YELLOW-BOOK, and so on.

Following insertion by a user of a CD-ROM 14 in slot 19 (FIG. 1), reader 21 (FIG. 2) sets CD-ROM 14 in rotation in a known way, reads the TOC area (Table Of Contents) and VTOC area (Volume Table Of Contents), if present, of CD-ROM 14 and transmits CPU 30 a message suitable for signalling that insertion has been made.

CPU 30 interprets the message received and transfers the data read by reader 21 to area 32*a* of RAM 32.

The data transferred to area 32*a* of RAM 32 are then compared with those stored in area 31*a* of ROM 31 in order to identify the type of CD-ROM 14 inserted.

Once the type of CD-ROM 14 inserted has been identified, CPU 30 transmits console 11, through data channel 33, I/O signals indicating what type of CD-ROM 14 has been inserted and other related information.

Microchip 40 (FIG. 2 and FIG. 3), upon reception of the I/O signals from CPU 30, drives display 47 so that messages corresponding to the type of CD-ROM 14 inserted in reader 21 are displayed and enables button panel 45 to enter commands in order to activate playback of the CD-ROM 14 inserted.

The following tables illustrate the function associated with each button 48 and the messages appearing on display 47, in relation to the type of CD-ROM 14 inserted in reader 21.

TABLE 1

| AUDIO-CD | |
|---|---|
| OPERATING CONDITIONS: | MESSAGE DISPLAYED: |
| On recognition of the CD | CD AUDIO |
|  | TOTAL TIME (MM:SS) |
|  | TRACK (nnn) |
| After recognition of the CD | TRACK (nnn) |
|  | CD AUDIO |
| Play | > |
|  | TRACK (nnn) |
|  | TIME (MM:SS) |
| Pause | \|\| |
|  | TRACK (nnn) |
|  | TIME (MM:SS) |
| Stop | TRACK |
|  | CD AUDIO |
| FF | TRACK (nnn) |
|  | > > |
|  | TIME (MM:SS) |
| RW | TRACK (nnn) |
|  | < < |
|  | TIME (MM:SS) |

TABLE 1-continued

AUDIO-CD

| OPERATING CONDITIONS: | MESSAGE DISPLAYED: |
|---|---|
| FF Scan | SCAN |
|  | > > |
|  | TRACK (nnn) |
| RW Scan | SCAN |
|  | < < |
|  | TRACK (nnn) |

TABLE 2

PHOTO CD

| OPERATING CONDITIONS: | MESSAGE DISPLAYED: |
|---|---|
| On recognition of the CD | PHOTO CD |
|  | PICTURE (nnn) |
| Play/Autoplay | PICTURE (nnn) |
|  | NEXT (nnn + 1) |
|  | Autoplay button blinking |
| Pause | \|\| |
|  | PICTURE (nnn) |
|  | NEXT (nnn + 1) |
| Stop |  |
| FF | > > |
|  | PICTURE (nnn) |
|  | NEXT (nnn + 1) |
| RW | < < |
|  | PICTURE (nnn) |
|  | NEXT (nnn + 1) |

TABLE 3

VIDEO CD

| OPERATING CONDITIONS: | MESSAGE DISPLAYED: |
|---|---|
| On recognition of the CD | VIDEO CD |
|  | TOTAL TIME (MM:SS) |
| Play | > |
|  | (MM:SS) |
| Pause | \|\| |
|  | (MM:SS) |
| Stop | VIDEO CD |
| FF | > > |
|  | (MM:SS) |
| RW | < < |
|  | (MM:SS) |

For example, if an AUDIO-CD type CD-ROM 14 is inserted in reader 21, the markings "CD" and "AUDIO" are lit on display 47 and also a message indicating the total playback time and the number of tracks recorded; furthermore, button panel 45 is enabled so that its pushbuttons 48 can command sound playback of the tracks.

Following depression of one of the buttons 48 of button panel 45 (FIG. 3), the "PLAY" button for example, a predefined signal is transmitted to microchip 40 where it is interpreted by CPU 43, on the basis of the settings recorded in the ROM 41 design stage, and converted into an interrupt signal INT for transmission to CPU 30 (FIG. 2), through line 51, and into an I/O signal for transmission to data channel 33 of motherboard 20.

CPU 30 thus commands reading and playback of CD-ROM 14 on the basis of predefined programs, memorised in RAM 32.

For example, if the CD-ROM 14 is AUDIO-CD type, the data read by the reader 21 are processed and transferred in a known way, through data channel 33, to speakers 22 for amplification and playback.

If the CD-ROM is PHOTO-CD type, the data read are processed and transferred in a known way to SCART controller 35 which, depending on the user-defined parameters stored in RAM 32, transmits the data to television 12, through socket 16 and cable 15 (FIG. 1), and/or to video recorder 13 through socket 18 and cable 17.

If CD-ROM 14 is VIDEO CD type, the data read are processed and transferred in a known way to SCART controller 35 (FIG. 2) and to speakers 22 for playback.

Figure 4:
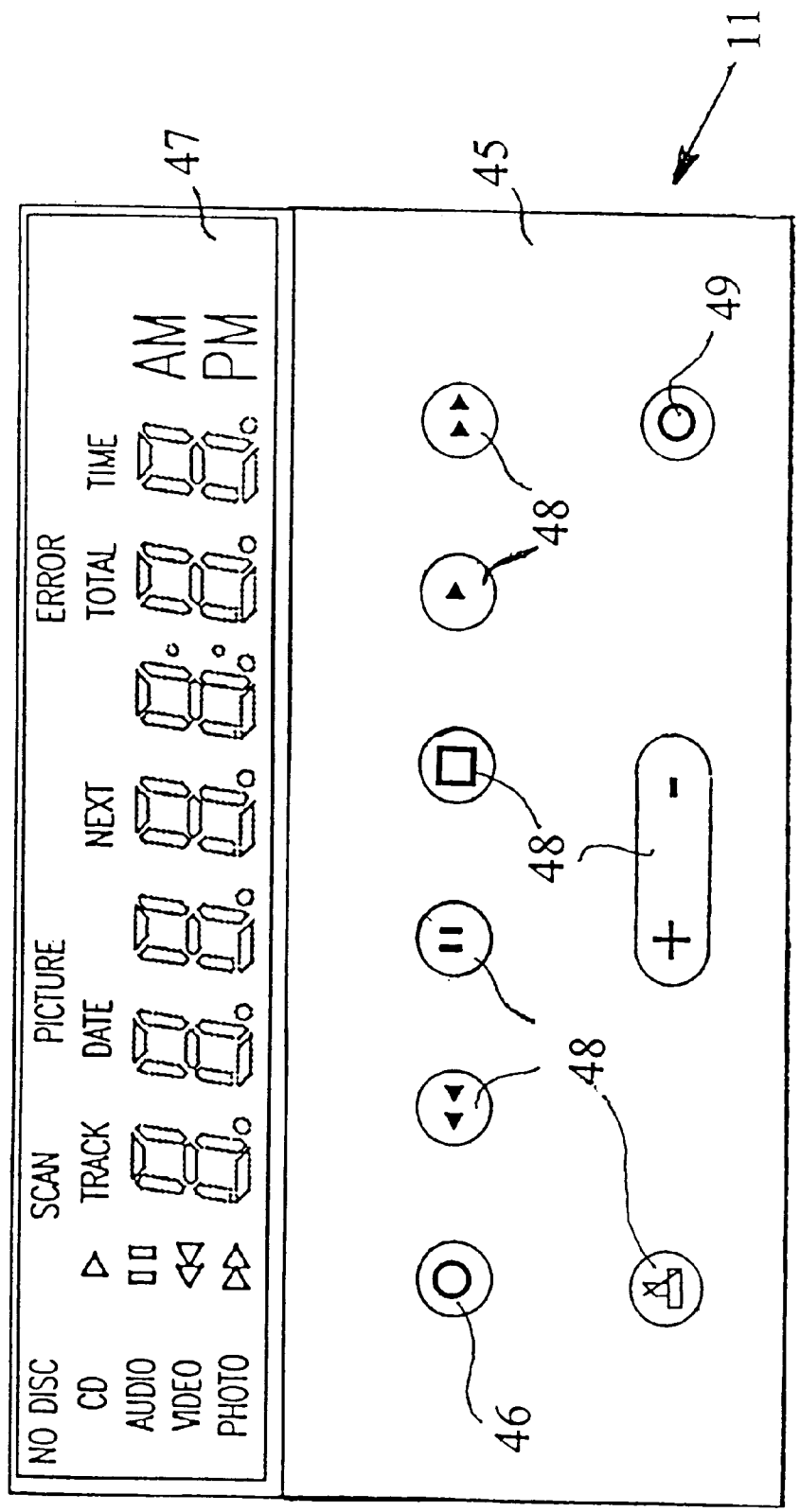
FIG. 4 is an enlarged scale view of the console of FIG. 3.

It will be clear that electronic computer 10 described up to here is suitable for recognising in an automatic way the type of magneto-optic medium 14 inserted in the reader 21 and for arranging for playback of the media 14 simply through depression of buttons 48 (FIG. 4).

It will also be clear that all the images displayed on television 12 may also be transmitted to video recorder 13 for recording.

Following playback of the different kinds of CD-ROM, or if button panel 45 or reader 21 (FIG. 2) remain inoperative for a predetermined period of time, CPU 43 (FIG. 3) transmits the SMI signal to CPU 30 (FIG. 2).

CPU 30, on receiving said signal, reads the predefined instructions in area 31b of ROM 31 and transmits, through data channel 33, commands suitable for suspending the activities of the peripheral units connected to motherboard 20 such as, for example, reader 21 and HDU 23. CPU 30 also transmits I/O signals to microchip 40 (FIG. 3) commanding LED 46 to light (FIG. 4), indicating the inoperative state of electronic computer 10 (FIG. 2).

In this way, after a predefined time ranging from some tens of seconds to a few minutes, electronic computer 10 automatically goes into a condition of reduced activity or stand-by during which the consumption of electrical energy is greatly reduced.

Only depression of a button 48 (FIG. 4) on button panel 45 or insertion of a new CD-ROM 14 in slot 19 (FIG. 1) can restore normal operating conditions. In actual fact, following depression of a button 48 (FIG. 3), for example, a signal is transmitted to microchip 40 that can send the SMI signal to CPU 30 (FIG. 2) which, having read the predefined instructions in area 31b of ROM 31, activates the peripheral units previously de-activated.

In parallel with signal SMI, CPU 43 also transmits an interrupt signal INT along line 51 and a corresponding I/O signal to data channel 33 (FIG. 2) which make CPU 30 execute the function corresponding to the button 48 (FIG. 1) actuated. Activation and de-activation of electronic computer 10 may be achieved in a similar manner to the above through depression of stand-by button 49 (FIG. 3) which is apt to transmit the SMI signal to CPU 30 by means of microchip 40 (FIG. 2).

Even in the electronic computer 10 stand-by condition (FIG. 2), the connection between plug 18 and plug 16 through SCART controller 35 is still good so that it is always possible to display ribbon tapes played by video recorder 13 on television 12 (FIG. 1).

In a further configuration of electronic computer 10 button panel 45, instead of being fitted on the computer basic structure, may be provided on a free-standing remote control device and be suitable, in this case, for transmitting remotely the signals corresponding to the predefined functions of button panel 45.

In yet another configuration, electronic computer 10 can be connected by means of connectors 61 and 62 to a keyboard and a known type of mouse commonly used in Personal Computers so that electronic computer 10 may be used as a common personal computer. In this form of use, it will be clear that both the buttons depressed and the processed data displayed by television 12 may be recorded by video recorder 13.

Further, electronic computer 10 can be connected by means of connector 63 to a known type monitor, commonly used in Personal Computers. In configurations of this type, both images recorded on PHOTO-CD or VIDEO-CD type CD-ROMs 14 and film clips read with video recorder 13 may be played back on this monitor, without the need for television 12.

It will be readily understood that modifications and changes may be made to the dimensions, shapes, components, circuit elements, connections and contacts, as also to the circuitry and construction details and method of operation of the electronic computer described up to now without in any way departing from the scope of this invention.

I claim:

1. An electronic computer (10) comprising a central processing unit (CPU) (30), memory means (31, 32) connected to said CPU (30) for storing data and programs, a compact disk (CD) reading unit (21) connected to said CPU (30) for reading data pre-recorded on a removable disk (14) of different type, input receiving means (61) connected to said CPU (30) for receiving input from an external input unit, connecting means (16,18,35) for connecting an external video unit (12) to said CPU (30), a physical console (11) having a plurality of actuating elements (48,49) selectively actuatable for generating command signals for commanding the functions of said CD reading unit (21) on the basis of predefined programs stored into said memory means (31, 32) and of the type of removable disk (14) inserted into said CD reading unit (21), and console control means (40) connected to said plurality of actuating elements (48), and to said CPU (30); wherein said CPU (30) is able to recognize the type of removable disk (14) inserted into said CD reading unit (21) by comparing the data read from said removable disk (14) with the data stored into said memory means (31,32) and to transmit to said console control means (40) an I/O signal indicative of the type of said removable disk (14) and wherein said console control means (40) is able to control said actuating elements (48) to generate command signals in accordance with said I/O signal.

2. An electronic (10) as defined in claim 1 wherein said display unit (46,47) is mounted on said physical console (11).

3. An electronic (10) as defined in claim 1, wherein said external video unit (12) is a television.

4. An electronic (10) as defined in claim 1, wherein said connecting means (16,18,35) is further connectable to a video reader/recorder unit (13) either for display on said external video unit (12) data read from said video reader/recorder unit (13) or for recording on said video render/recorder unit (13) said pre-recorded data and/or data processed by said CPU (30).

5. An electronic computer (10) as defined in claim 1, further comprising a switching element (49) connected to said console control means (40), wherein said switching element (49) is actuatable for switching said CPU (30) from a full performance operating state to a reduced performance operating state and vice versa.

6. An electronic computer as defined in claim 1, further comprising a display unit (46,47) connected to said console control means (40), wherein said console control means (40) is able to control said display unit (46,47) to display information relating to the type of removable disk (14) inserted into said CD reading unit (21).

7. An electronic computer (10) as defined in claim 1, further comprising power management means (31*b*) for switching said CPU (30) from a full performance operating state to a reduced performance operating state and vice versa and wherein said connecting means (16,18,35) is further connectable to a video reader/recorder unit (13) for displaying on said external video unit (12) data read from said video reader/recorder unit (13) during said reduced performance operating state.

* * * * *